(12) United States Patent
Sumser et al.

(10) Patent No.: US 6,733,236 B2
(45) Date of Patent: May 11, 2004

(54) COMPRESSOR IN A TURBOCHARGER

(75) Inventors: Siegfried Sumser, Stuttgart (DE); Peter Fledersbacher, Stuttgart (DE); Helmut Finger, Leinfelden-Echterdingen (DE); Helmut Daudel, Schorndorf (DE); Gebhard Bopp, Adelberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/176,889

(22) Filed: Jun. 21, 2002

(65) Prior Publication Data

US 2003/0115872 A1 Jun. 26, 2003

(30) Foreign Application Priority Data

Jun. 23, 2001 (DE) .......................................... 101 30 415

(51) Int. Cl.[7] .............................................. F04D 29/44
(52) U.S. Cl. ........................................ 415/204; 138/39
(58) Field of Search .............................. 415/204, 211.2; 138/44, 39

(56) References Cited

U.S. PATENT DOCUMENTS 5,007,499 A * 4/1991 Ebbing et al. ............... 181/258

FOREIGN PATENT DOCUMENTS

DE 196 47 605 5/1998

* cited by examiner

Primary Examiner—Edward K. Look
Assistant Examiner—Kimya N McCoy
(74) Attorney, Agent, or Firm—Kenyon & Kenyon

(57) ABSTRACT

A compressor in a turbocharger has a compressor impeller in an inflow passage and an outflow region downstream of the compressor-impeller outlet edge. The outflow region is assigned a connecting passage, a stabilizing chamber and an outflow passage, the connecting passage being arranged with a lateral offset with respect to a longitudinal center axis of the stabilizing chamber.

10 Claims, 1 Drawing Sheet

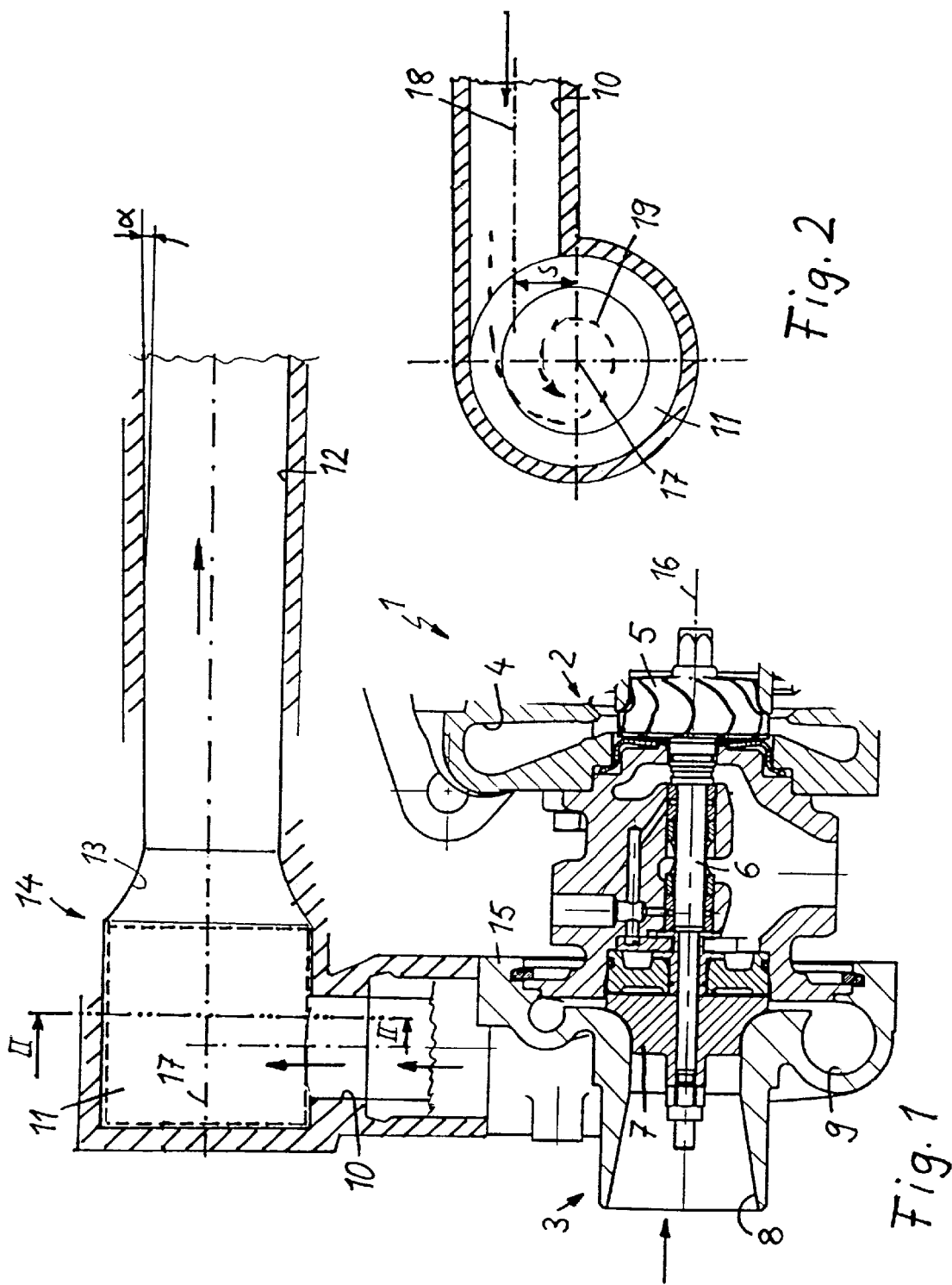

COMPRESSOR IN A TURBOCHARGER

FIELD OF THE INVENTION

The invention relates to a compressor in a turbocharger.

BACKGROUND INFORMATION

German Published Patent Application No. 196 47 605 describes an exhaust-gas turbocharger for an internal combustion engine, the compressor of which has an axial inflow passage for supplying combustion air, which sucks in air via the rotating compressor impeller and conveys it via a radial diffuser at the compressor-impeller outlet edge into a helical passage. The charge air, which has been compressed to an elevated pressure, is usually discharged from the helical passage which radially surrounds the compressor impeller, via an outflow pipe, to the cylinder intake or a charge-air cooler, the outflow pipe, for space reasons, often being guided in the axial direction, so that a diversion of approximately 90° is required between diffuser or helical passage and outflow pipe. This change in direction of the charge air which is to be removed may lead to pulsating flow delaminations and turbulence in the wall region of the outflow pipe, which leads to a throttling effect in the outflow pipe and has an adverse effect on the pump limit in the compressor characteristic diagram which limits the compressor operating range toward low mass flows passing through the compressor. The structural design of the outflow region of a compressor may therefore have an adverse effect on the working range.

A further adverse effect on the compressor working range may be caused by the pressure pulses which prevail in the induction line of the internal combustion engine, which have adverse effects on the compressor via the outflow region thereof and in particular may cause operation of the compressor in the vicinity of the pumping limit to deteriorate.

SUMMARY

It is an object of the present invention to increase the working range of a compressor in a turbocharger by a simple arrangement.

The above and other beneficial objects of the present invention are achieved by providing a compressor in a turbocharger as described herein.

In total, the compressor outflow region has at least three sections of different configuration, which are in a defined, preset relationship with respect to one another. The compressor-impeller outlet edge is directly adjoined firstly by a connecting passage which, over the further flow path, opens out into a stabilizing chamber of widened cross-section. The connecting passage is in this case arranged with a lateral offset with respect to a longitudinal center axis of the stabilizing chamber, with the result that a swirling motion is imparted to the charge air which flows into the stabilizing chamber and has been compressed to a high charge pressure. Turbulence on entry to the stabilizing chamber is avoided by the widening in the cross-section of the stabilizing chamber compared to the connecting passage which supplies the air. The swirling flow may be generated or influenced by the offset of the axis with respect to the longitudinal center axis or the longitudinal center plane of the stabilizing chamber. To achieve sufficient swirling movement, a limit value may be predetermined which is to be exceeded for the ratio of the temporal offset between connecting passage and stabilizing chamber to the cross-section of flow of the connecting passage.

The stabilizing chamber is adjoined by an outflow passage, via which the compressed medium is discharged from the compressor and, in the case of an exhaust-gas turbocharger as a unit of an internal combustion engine, is fed to the cylinder inlet or an upstream charge-air cooler. The connecting passage on the inflow side of the stabilizing chamber and the outflow passage on the outlet side or outflow side of the stabilizing chamber include an angle, in particular an angle of approximately 90°. This makes it possible to produce radial compressors with a radially extending connecting passage between the compressor-impeller outlet edge and the stabilizing chamber and with an axial outflow passage, which extends parallel to the compressor-impeller axis, on the outlet side of the stabilizing chamber. This configuration is distinguished in particular by a compact structure. The risk of flow delamination in the subsequent outflow passage is reduced by the turbulence imparted to the flow in the stabilizing chamber.

A further feature of the compressor outflow region, which includes three different sections, is the damping of pressure pulses from the intake section of the internal combustion engine, which are damped and reduced in the relatively large volume of the stabilizing chamber. This reduces adverse effects on the compressor performance.

In one exemplary configuration, the stabilizing chamber is of cylindrical configuration, the longitudinal center axis of the stabilizing chamber extending orthogonally with respect to the longitudinal axis of the connecting passage. Due to the lateral offset between the respective axes of connecting passage and stabilizing chamber, the compressed medium flows out of the connecting passage into the lateral region of the stabilizing chamber and is diverted in circular form due to the cylindrical shape of the stabilizing chamber. In this case, the outer wall of the connecting passage may be arranged tangentially with respect to the wall of the cylindrical stabilizing chamber, so that steps in the transition from the connecting passage to the stabilizing chamber, which may produce turbulence, are avoided.

The stabilizing chamber and the outflow passage may be arranged coaxially with respect to one another, i.e., there is no need for any further diversions of the compressed medium during the transfer from the stabilizing chamber into the outflow passage. The outflow passage may in particular have a smaller cross-section than the stabilizing chamber, and an inlet contour which is favorable in terms of flow may be provided in the transition.

In a further example embodiment, the outflow passage is configured as a diffuser which has a cross-section which widens in the direction of flow, the widening angle being, e.g., less than 5°.

In a further example embodiment, the volume of the stabilizing chamber is set in a predetermined ratio to the free cross-section of flow of the connecting passage, while, e.g., a predetermined limit value in the ratio of chamber volume to passage cross-section of flow is to be exceeded.

BRIEF DESCRIPTION OF THE DRAWINGS

FIG. 1 is a cross-sectional view through a turbocharger having a turbine and a compressor, the outflow region of which includes a radial connecting passage, a stabilizing chamber and an axial outflow passage.

FIG. 2 is a cross-sectional view taken along the line II—II illustrated in FIG. 1.

DETAILED DESCRIPTION

The turbocharger 1 illustrated in FIG. 1 is in particular an exhaust-gas turbocharger which is used as a unit of an internal combustion engine and is driven by the exhaust gases from the internal combustion engine in order to generate compressed charge air. The turbocharger 1 includes a turbine 2 and a compressor 3, in which arrangement the driving, pressurized exhaust gas is to be fed to a turbine impeller 5 of the turbine 2 via a helical passage 4 and the movement of the turbine impeller 5 is transmitted via a shaft 6 to the coaxially arranged compressor impeller 7, which sucks in combustion air via an axial inflow passage 8 and compresses it to an elevated charge pressure, under which the charge air is discharged via a radial diffuser into a helical passage 9, which surrounds the compressor impeller 7, downstream of the compressor-impeller outlet edge.

A connecting manifold 14, by which, in the case of an exhaust-gas turbocharger, the connection between the compressor outlet and a subsequent charge-air cooler or charge-air pipe may be produced, is provided at the compressor outlet on the helical passage. The connecting manifold 14 is connected to the compressor housing 15 and forms a part of the outflow region of the compressor 3. The connecting manifold 14 may be configured as a component which is configured separately from the housing 15 of the compressor 3 and is to be connected to the compressor housing 15 or, in an alternative example embodiment, may be formed integrally with the compressor housing.

The connecting manifold 14 includes three sections: a connecting passage 10, a stabilizing chamber 11 and an outflow passage 12. In the assembled position, the connecting passage 10 extends radially with respect to the axis of rotation 16 of the charger, whereas the outflow passage 12 extends parallel to the axis of rotation 16. The diversion of the compressed medium flowing into the connecting manifold 14 occurs in the stabilizing chamber 11 as a linking member between connecting passage 10 and outflow passage 12. The stabilizing chamber 11 is firstly responsible for imparting a swirling movement to the medium flowing out of the connecting passage 10, in the radial direction with respect to the axis of rotation 16, into the stabilizing chamber 11 and diverting this medium into the outflow passage 12, which extends at an angle of 90° with respect to the connecting passage 10. Secondly, the stabilizing chamber 11 has the task of reducing pressure pulses from the internal combustion engine, which are transmitted back into the compressor via the intake line.

As illustrated in FIGS. 1 and 2, the stabilizing chamber 11 is of cylindrical structure, the axis of rotation or longitudinal axis 17 of the stabilizing chamber 11 coinciding with the longitudinal axis of the outflow passage 12. The connecting passage 10 opens out into the stabilizing chamber with a lateral offset s, which denotes the distance between the longitudinal axis 18 of the connecting passage 10 and a center plane through the longitudinal axis 17 of the stabilizing chamber 11. The offset s may be selected so that an outer wall of the connecting passage 10 merges tangentially into the wall of the stabilizing chamber 11, so that the compressed medium which flows into the stabilizing chamber 11 via the connecting passage 10 is provided with a swirling movement while avoiding turbulence, c.f. dashed line 19 illustrated in FIG. 2.

The connecting passage 10 has a smaller cross-sectional area $A_A$ than the stabilizing chamber 11. The ratio of lateral offset s between the connecting passage 10 and stabilizing chamber 11 to the cross-section of flow $A_A$ of the connecting passage 10 may be used as a measure of the swirl which may be generated in the stabilizing chamber 11. To achieve a sufficiently high swirl, the geometries may be adapted to one another so that the ratio $s/A_A$ exceeds a predetermined limit value $GR_1$ or that the reciprocal ratio $A_A/s$ is in a range between 0.5 and 3 length units.

The damping properties of the stabilizing chamber 11 for reducing pressure pulses may be determined by the ratio of volume $V_{Ber}$ of the stabilizing chamber to the cross-section of flow $A_A$ of the connecting passage 10, with a further limit value $GR_2$, which may be exceeded, e.g., being predetermined for the ratio $V_{Ber}/A_A$. In particular, the ratio $V_{Ber}/A_A$ is of the order of magnitude of 100 to 950 length units.

With regard to the cross-section of flow $A_A$, the dimensioning rules given above may relate to the inlet cross-section in the transition from the connecting passage 10 to the stabilizing chamber 11.

The ratio to the engine displacement $V_{Mot,H}$ may be taken into account as an additional dimensioning rule for the volume $V_{Ber}$ of the stabilizing chamber. The ratio $V_{Ber}/V_{Mot,H}$ may be of the order of magnitude of 0.1 to 2.

The outflow passage 12 which, like the connecting passage 10, may be circular in cross-section likewise has a smaller cross-sectional area than the stabilizing chamber 11. The transition between stabilizing chamber 11 and outflow passage 12 is produced by a transition pipe section 13 which has contours which are favorable in terms of flow, in order to avoid flow losses. The outflow passage 12 may be configured as a diffuser, the cross-section of which widens in the direction of the flow. The widening angle a is in this case may be less than 5°.

What is claimed is:

1. A compressor in a turbocharger, comprising:

a compressor inflow passage;

a compressor impeller arranged in the compressor inflow passage;

a compressor outflow region arranged downstream of a compressor-impeller outlet edge, the compressor outflow region including:

a connecting passage;

a stabilizing chamber having a cross-section that is wider than a cross-section of the connecting passage;

an outflow passage connected to the stabilizing chamber configured to discharge compressed medium from the compressor;

wherein the connecting passage is configured to open out into the stabilizing chamber with a lateral offset with respect to a longitudinal center axis of the stabilizing chamber, the outflow passage and the connecting passage including an angle.

2. The compressor according to claim 1, wherein the stabilizing chamber includes a cylindrical structure, the longitudinal center axis of the stabilizing chamber extending orthogonally with respect to a longitudinal axis of the connecting passage.

3. The compressor according to claim 1, wherein the connecting passage includes a wall that extends tangentially with respect to a wall of the stabilizing chamber.

4. The compressor according to claim 1, wherein the stabilizing chamber and the outflow passage are arranged coaxially.

5. The compressor according to claim 1, wherein the outflow passage has a smaller cross-section than the stabilizing chamber.

6. The compressor according to claim 1, wherein the outflow passage is configured as a diffuser and has a cross-section that widens in a direction of flow.

7. The compressor according to claim 6, wherein the outflow passage has a widening angle of less than 5°.

8. The compressor according to claim 1, wherein a ratio of the lateral offset between the connecting passage and stabilizing chamber to a cross-section of flow of the connecting passage exceeds a predetermined limit value.

9. The compressor according to claim 1, wherein a ratio of a volume of the stabilizing chamber to a cross-section of flow of the connecting passage exceeds a predetermined limit value.

10. The compressor according to claim 1, wherein the turbocharger includes an exhaust-gas turbocharger for an internal combustion engine.

* * * * *